May 24, 1938. O. W. ELLIS 2,118,299
BIMETALLIC SEALING DEVICE
Filed Nov. 30, 1935
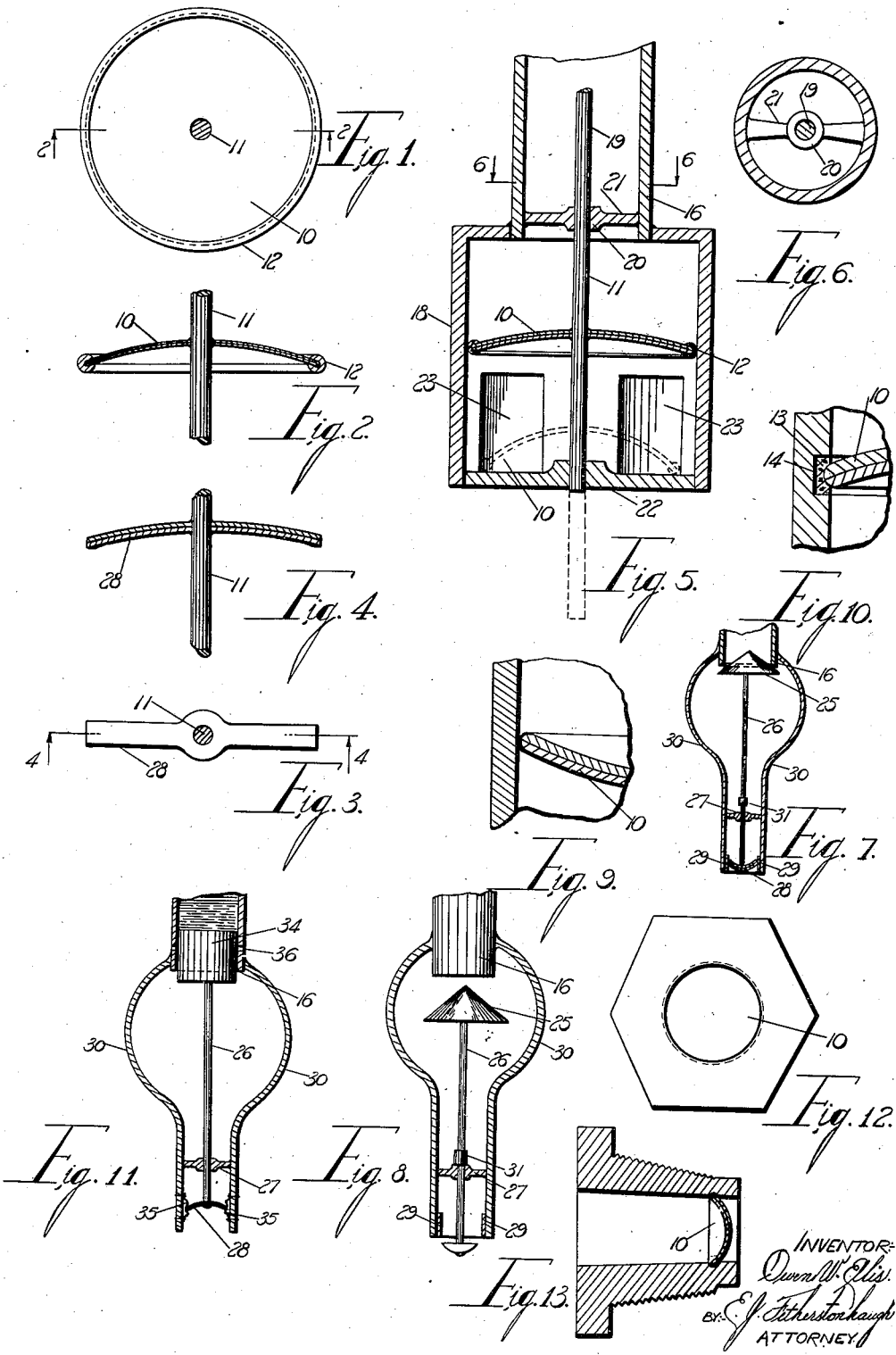

Patented May 24, 1938

2,118,299

UNITED STATES PATENT OFFICE 2,118,299

BIMETALLIC SEALING DEVICE

Owen William Ellis, Forest Hill, Ontario, Canada

Application November 30, 1935, Serial No. 52,326

1 Claim. (Cl. 137—161)

The invention relates to a bi-metallic sealing device, as described in the present specification and illustrated in the accompanying drawing which forms a part of the same.

The invention consists essentially in the use of bi-metallic elements of various forms, such, for example, as cupped discs, curved strips, etc., which may of themselves be used to seal tubular passages or openings in vessels of various kinds, whether metallic or non-metallic, or which may, through the medium of straight rods fitted with valves of various types, systems of levers coacting with valves of various types, or other mechanical devices coacting with valves of various types, ensure the closure of tubular passages, or openings of various shapes in vessels of various kinds, whether metallic or non-metallic, until such times as certain predetermined temperatures, whether higher or lower than are considered desirable, have been reached, at which predetermined temperatures the bi-metallic elements, whether cupped discs, curved strips, etc., shall, owing to their change in shape as a result of change in temperature, cause the tubular passages, or openings in vessels of various kinds, to become unsealed.

The objects of the invention are to provide self-releasing safety devices of such delicacy of action as shall ensure their immediate response to any rise or fall of temperature above or below certain predetermined temperatures; to construct devices that, despite their delicacy of action, shall be so rugged as to be unaffected by sudden shocks or blows, thereby minimizing the possibility of their response to changes other than changes in temperature only; to build devices which shall ensure against damage to merchandise and property on account of any rise or fall in temperature beyond a certain predetermined temperature; to provide devices which shall be sensitive to emergency conditions where excessive heat or cold exists, yet will retard the time of their release until conditions fully warrant their release; to supply devices which shall not deteriorate with time, as a result, for example, of corrosion, and which on this account will remain permanently positive in action; and, generally, to provide devices which shall be of comparatively simple construction, efficient and dependable, reasonable in cost of production without affecting their durable and efficient properties for the purposes set forth.

In the drawing:

Figure 1 is a plan view of a cupped sealing disc with a rod and a deformable washer united thereto.

Figure 2 is a cross-sectional view of the cupped disc and washer taken on the lines 2—2 of Figure 1, and showing the rod.

Figure 3 is a plan view of a uniformly curved bi-metallic element strip with a rod united thereto.

Figure 4 is a cross-sectional view of the uniformly curved bi-metallic element strip taken on the lines 4—4 of Figure 3, and showing the rod.

Figure 5 is a side sectional view of an acceptable form of automatic discharge valve.

Figure 6 is a sectional plan view of the discharge valve stem spindle guide taken on the lines 6—6 of Figure 5.

Figure 7 is a side sectional view of another acceptable form of automatic discharge valve, fitted with a bi-metallic element such as is shown in Figures 3 and 4.

Figure 8 is a side sectional view of a device similar to that shown in Figure 7 but fitted with a bi-metallic disc, showing the valve in released position.

Figure 9 is a fragmentary sectional view showing a plain bi-metallic disc as applied in an opening.

Figure 10 is a fragmentary sectional view showing the disc with a deformable washer used in conjunction therewith.

Figure 11 is a side sectional view of another form of automatic discharge valve, in which a bi-metallic strip is supported in spring clips.

Figure 12 is a plan view of boiler safety plug.

Figure 13 is a side sectional view of a boiler safety plug, showing the cupped disc as applied thereto.

Like numerals of reference indicate corresponding parts in the various figures.

Referring to the drawing, the bi-metallic cupped disc as indicated by the numeral 10 may be used either alone or in combination with a washer of deformable material, such as cork, rubber, lead, etc. The cupped disc may be free from attached parts, or may be fitted with a handle for facilitating its insertion in or removal from the opening it is intended to seal, or with a rod or stem 11, as shown in Figures 2, 5, 7 and 8, which may serve as a guide to control the movement of the disc in a direction at right angles to the chord of the disc. It is, of course, understood that numerous other attached devices for controlling the movement of the disc could be employed. The washer 12 may be permanently attached to the disc as shown, or may be fitted into a suitable groove 14 in the walls of the opening into which the disc is fitted.

When the disc itself is employed as a seal, as shown in Figures 9, 12 and 13, and no washer of deformable material is used, it is, of course, essential that the disc be so finished mechanically that it makes contact at all points with the walls of the opening it is intended to seal. Conversely, the walls of the opening, or, if a slight recess be provided for the reception of the disc, the walls of the recess, must be machined true if a perfect seal is to be obtained.

The use of a washer of deformable material obviates the necessity of very great care in the finishing of the outer and inner circumference of the disc and its seating, respectively, whether the seating be the walls, or a slight recess in the walls, of the opening, since irregularities in finish will be taken up by the deformable material.

The bi-metallic cupped disc 10 may be so designed that no matter what the limits of temperature within which it operates, its upper and lower surfaces will remain either concave and convex, respectively, or convex and concave, respectively. When it is intended that the disc operates at a temperature higher than is considered normal, the disc may be designed to fit snugly at the normal temperature and to come free at a predetermined higher temperature considered to be dangerous. When it is intended that the disc operate at a temperature lower than is considered normal, the disc may be designed to fit snugly at the normal temperature and to come free at a predetermined lower temperature considered to be dangerous. In other words, the disc may be so designed that its diameter increases or decreases with rise in temperature, or, conversely, decreases or increases with fall of temperature.

In a particular application of the invention, a combination of disc and washer, or disc alone, may be employed to seal the end of a pipe such as is used in sprinkler systems and is shown in Figure 5 of the drawing.

The end of the feed delivery pipe 16, as shown in Figure 5, is suitably enlarged as indicated by the numeral 18 to accommodate the cupped disc 10. In this case the movement of the disc is controlled by the stem 19, which not only guides the disc but maintains it in proper alignment. This rod may be attached to the disc by welding or by any other well known means and is adapted to move freely in the guide bearings 20 which are formed in the guide member 21 situated in the feed delivery pipe 16 and in the end wall 22 of the enlarged end portion 18.

In this application of the invention the disc is so designed that when heated to a predetermined temperature it shall enter the enlarged end of the pipe freely and, when cooled to room temperature, shall, as a result of its increase in diameter, seal the pipe.

On reheating the pipe and its contents to a predetermined temperature, the disc will become loose in the pipe, and on account of pressure of the contents of the pipe, will be forced out of it, thus allowing its contents to escape.

In Figure 5 of the drawing, the enlarged end portion has outlet openings in the side walls thereof as indicated by the numeral 23, the end wall 22 being adapted to prevent the disc 10 and stem 19 being forced outwardly clear of the pipe.

In another application of the invention, either a bi-metallic curved strip 28, as in Figure 7, or a bi-metallic cupped disc 10, as in Figure 8, may be used to control the operations of a valve through the medium of a rod.

In Figure 7 of the drawing, the conical valve 25 forms the closure for the pipe 16, and is united to the valve stem 26, which is suitably guided by the guide bearing 27. In this case the curved strip 28 initially makes contact with the plates 29, which may be attached to the supports 30 by bolting, welding, or other suitable means. In this case the valve stem has the shoulder 31 formed thereon to control the length of travel of the valve stem, and, consequently, the size of the opening which forms between the valve 25 and the end of the pipe 16, when, as a result of a rise or fall above or below the predetermined temperature, the curved strip is released from its seating on the plates 29. It should be noted that the design of valve used in closing the end of the pipe 16 may be varied to suit conditions, and that a slide, piston, or other type of valve might be equally effective, though for the purpose of distributing the contents of the pipe when the strip is released a conical valve is to be preferred.

It will be understood that, not only the form of the valve may be altered to suit any purpose, but that the strip may be convex or concave towards the pipe, and that the means of support for the strip and the guide bearing may be changed in accordance with conditions.

The use of levers or systems of levers, or other mechanical devices, coacting with the disc and the valve is not precluded by the particular design in Figure 7.

In Figure 8 is shown a design similar to that in Figure 7, except that the strip has been replaced by the cupped, bi-metallic disc 10, such as has been shown in detail in Figures 1 and 2.

In another application of the invention, a bi-metallic strip or disc is so designed that its curvature will be reversed at a certain predetermined temperature. In Figure 11 of the drawing, the piston valve 34 forms the closure for the pipe 16 and is united to the valve stem 26, which is suitably guided by the guide bearing 27. At the lower end of the valve stem is attached a curved strip 28, in place of which, however, a cupped disc could be used. The curved strip is held in position by two springs 35 suitably designed and disposed. These springs are arranged so as to allow the curved strip to snap over from the position shown in the drawing to the reverse position; to wit, the position with its upper surface convex to the valve 34. When the reversal of curvature takes place, the movement of the valve 34 will be such as to expose the openings in the pipe 16, so that water shall escape from it.

Other means of supporting the curved strip so as to allow it to snap over without becoming loose can be devised, and, as already stated, a cupped disc can be substituted for a curved strip. When a cupped disc is used, recourse may be had to a rubber washer 13, such as is shown in Figure 10.

While in the above applications consideration has been given to the closure of pipes, the use of combinations of bi-metallic discs or strips and valves for the closure of openings of all types in vessels of all types is not precluded, since my invention can be applied generally to ensure the release of the contents of vessels of all types at certain predetermined temperatures which may or may not be considered dangerous either to the contents of the vessels or to materials in their vicinity.

What I claim is:

In a sealing device, a pipe, a valve adapted to close the end of said pipe, a support secured to said pipe, a guide bearing secured to said support, a valve stem secured to said valve and extending through said guide bearing, a retaining member secured to said support, and a thermally responsive element secured to said valve stem and held by said retaining member.

OWEN WILLIAM ELLIS.